(No Model.)
J. C. FARMER & C. A. SHAW.
CAR SIGNAL.
No. 373,063. Patented Nov. 15, 1887.
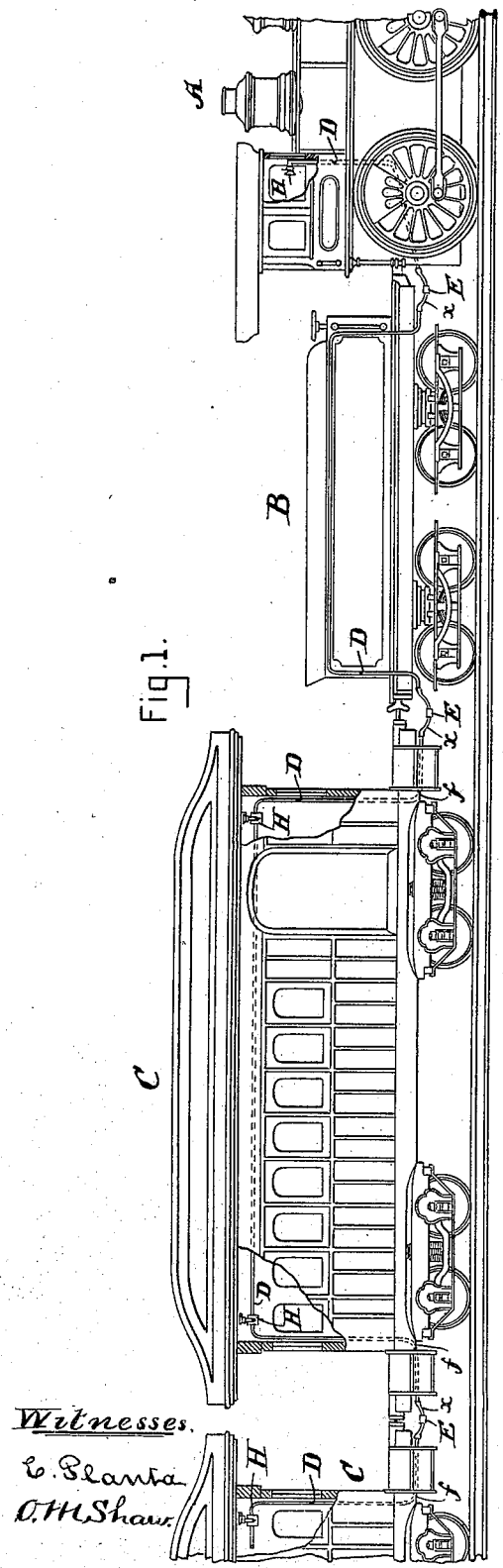
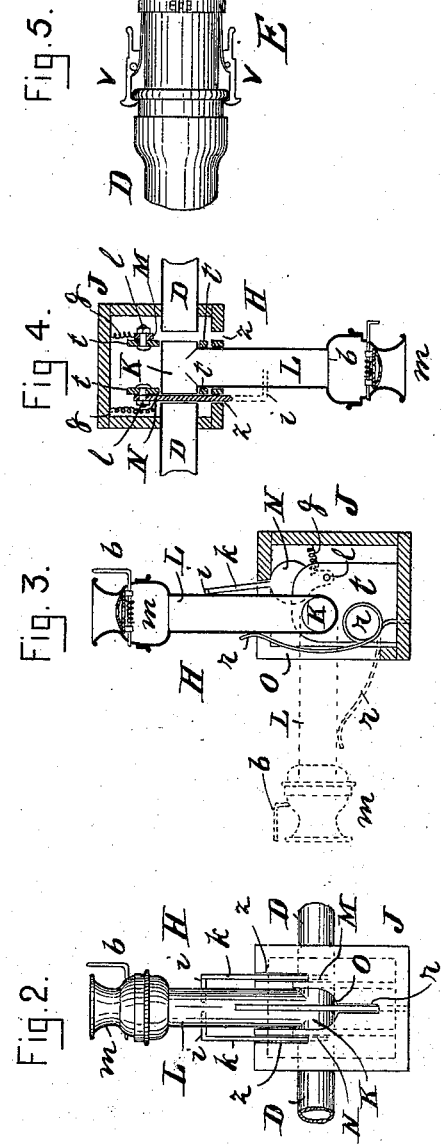
Witnesses
E. Planta
O. H. Shaw
Inventors:
James C. Farmer
Charles A. Shaw
Per C. A. Shaw
Attorney

UNITED STATES PATENT OFFICE.

JAMES C. FARMER, OF PROVIDENCE, RHODE ISLAND, AND CHARLES A. SHAW, OF BOSTON, MASSACHUSETTS.

CAR-SIGNAL.

SPECIFICATION forming part of Letters Patent No. 373,063, dated November 15, 1887.

Application filed October 13, 1886. Serial No. 216,095. (No model.)

*To all whom it may concern:*

Be it known that we, JAMES C. FARMER, of Providence, in the county of Providence, State of Rhode Island, and CHARLES A. SHAW, of Boston, in the county of Suffolk, State of Massachusetts, have invented a certain new and useful Improvement in Means for Communicating between the Cars and Engine of Railway-Trains, of which the following is a description sufficiently full, clear, and exact to enable any person skilled in the art or science to which said invention appertains to make and use the same, reference being had to the accompanying drawings, forming part of this specification, in which—

Figure 1 is a side elevation of a railway-train embodying our improvement, a portion of the engine and also of one of the cars being represented as removed; Fig. 2, a front elevation representing the mouth-piece of the speaking-tube as raised; Fig. 3, a vertical transverse section taken near the center of Fig. 2, certain parts being shown in side elevation; Fig. 4, a horizontal section of the parts shown in Fig. 2, the mouth-piece being represented as depressed; and Fig. 5, an elevation of the coupling.

Like letters of reference indicate corresponding parts in the different figures of the drawings.

It is well known that in running railway-trains it is frequently necessary for the conductor or brakeman to communicate with the engineer while the train is in motion. This is ordinarily accomplished by means of a signal cord and bell, the cord extending through the cars the entire length of the train and having its forward end connected with the bell in the cab of the engine and its rear end secured at the rear end of the train.

An open-circuit electric apparatus has also been employed for the same purpose, the conducting-wires being connected with a bell in the cab of the engine and with pressure-buttons or means for closing the circuit in the cars, and thereby ringing the bell in the cab. There are, however, many objections to a cord, and also to an electric apparatus, as a medium of communication between the conductor and engineer or persons in charge of a railway-train, the principal one being the necessity of using a code of signals instead of communicating orally, thus confining the communications within very narrow limits, and also rendering serious mistakes liable to occur.

Our invention relates to car-signals in which speaking-tubes are employed, whereby the objections referred to are avoided; and the object of the invention is to provide an apparatus of this character which can be operated with facility and certainty in connection with any car of the train.

In the drawings, A represents the engine, B the tender, and C the cars, which may all be of the ordinary form and construction.

The train is provided with a speaking-tube, D, extending from the cab of the engine to the rear car. Its forward end may, however, terminate in the tender at some point convenient to the engineer or fireman, and its rear end in the baggage-car of the train, if desired.

Between the cars, and also between the forward car and tender and tender and engine, the tube is elongated or so constructed and arranged as to form the "slacks" or sagging portions *x* to prevent any undue strain on the tube at those points when the train is started up. The tube is also coupled between the cars and between the tender and engine and engine and forward car by an ordinary coupling, E, as shown in Fig. 5, the two members of the tube at each coupling being held connected by spring-catches *v* in substantially the same manner that the pipes of air-brakes are coupled, so that they may be forcibly detached or drawn apart without injury when the cars are unshackled.

Within the cars the tube is disposed near the roof, and so constructed and arranged as to pass down through the floor at either end of the car and beneath the platforms, as shown at *f* in Fig. 1. It may, however, be arranged on top of the car, or beneath it, if desired, suitable branch tubes and mouth-pieces being of course provided for the use of the conductor and brakeman, although it is deemed preferable to arrange it as shown.

The tube is arranged vertically within the cab of the engine and passes down through the floor thereof and along one side of the tender near its top; but it may be supported in any suitable manner or position on the tender and arranged in any convenient position within the cab.

The slack portions $x$ of the tube are preferably composed of rubber or leather and its body of metal or rubber; but any other suitable materials may be used in its construction.

The tube D is provided with a mouth-piece, H, at either end of each of the cars C, and also in the cab of the engine A.

The construction and arrangement of the mouth-piece and the mechanism immediately connected therewith are best seen in Figs. 2, 3, and 4.

At each mouth-piece within the car the tube D is cut and a small box, J, inserted therein, the ends of said tube passing through the sides of the box opposite each other, as shown in Figs. 2 and 4.

A short tube, K, is arranged horizontally within the box J between the ends of the tube D, (see Fig. 4,) the short tube being journaled to rock or rotate in the bearings or partitions $t$, and provided with a branch tube or arm, L, at the outer end of which is disposed the mouth-piece proper, $m$, said mouth-piece being provided with an ordinary alarm-whistle, $b$, having a spring for keeping it closed or in position for use when the mouth-piece is not in use, and a crank for opening it or turning it to one side when speaking through the mouth-piece in the usual manner.

Two valves or cut-offs, N M, are respectively pivoted at $l$ to the partitions $t$ within the box J, said valves being each provided with an arm, $k$, which projects through an elongated slot, $z$, in the box J, and is bent inwardly at its outer end over the arm L, as shown at $i$.

A slot, O, is formed in the front of the box to enable the arm carrying the mouth-piece proper to be depressed, as shown in Fig. 4, when in use, a spring, $r$, being provided to elevate the arm, as shown in Fig. 3, when the mouth-piece is not in use.

Each of the valves N M is provided with a coiled spring, $g$, for keeping it elevated, as shown in Figs. 2 and 3, when it is not employed in closing the tube.

In the use of our improvemement, when the conductor of the train has occasion to communicate with the engineer he steps to the nearest mouth-piece in the car where he happens to be at the time, pulls the arm L down until the mouth-piece proper, $m$, is brought into a convenient position, closes the valve N, opens the whistle $b$, and blows through the tube to sound the whistle in the mouth-piece in the cab of the engine. The engineer then steps to his end of the tube, throws back the whistle in the mouth-piece, and signifies to the conductor that he is awaiting his message, after which they may hold a conversation through the tube in a manner which will be readily obvious without a more explicit description. After the message has been sent, the valve N and arm L are released and assume the vertical position shown in Figs. 2 and 3, the arm being elevated by the spring $r$ and the valve by its spring $g$.

The object of bending the arms $k$ of the valves, as shown at $i$, is to bring them into the path of the arm L, so that in case the springs $g$ should fail to elevate the valves M N when they are released after being employed to close the tube the arm L, forced upwardly by the spring $r$, will strike the bent portions $i$, open said valves, and keep them open until required for use.

It will be understood that when the tube D is not in actual use it should be open its entire length, to enable the conductor or brakeman to communicate freely with the engineer, and vice versa; and it is therefore very important that the valves M N should not be left closed after using the tube.

The object of the valve M is to close the tube between the mouth-piece and engine, and thereby enable the conductor to communicate with the brakeman at the rear of the train. For instance, if the conductor is on the forward car and desires to speak with a brakeman on the rear car of the train he closes the valve M at the mouth-piece he is using to prevent the sound from passing forward to the engine, and uses the mouth-piece substantially as already described.

When the conductor is speaking with the engineer, the valve N at the mouth-piece he is using is closed to prevent the sound from passing to the rear of the train.

The rear end of the tube should be closed; but this may be accomplished by closing the valve N at the rear mouth-piece in the rear car and securing it closed.

It will be understood that the valves M N are not employed at the mouth-piece within the cab.

When the engineer desires to speak with the conductor or brakeman, he turns back the whistle in the mouth-piece in the cab and blows through the tube, thereby causing all of the whistles in the cars to sound, a prearranged number of blasts being given. For instance, to call the conductor two blasts may be given, and to call the brakeman three, or any other number previously agreed upon or established by the management of the road.

The mouth-pieces in the cars may be inclosed, if desired, in such a manner as to prevent them from being tampered with by passengers or others.

When the pipe is used in connection with freight-trains, the mouth-piece may be arranged at the top of the car or at either end, the pipe being disposed within, on top, or beneath the car, as desired.

Having thus explained our invention, what we claim is—

1. In a device of the character described, the combination of a main-line speaking-tube, a valve in said main-line tube for closing the same, and a branch speaking-tube connected with said main-line tube adjacent to said valve, substantially as described.

2. In a device of the character described, the combination of a main-line speaking-tube, a valve in said main-line tube for closing the same, a spring for automatically opening said valve, and a branch speaking-tube connected with said main-line tube adjacent to said valve, substantially as set forth.

3. In a device of the character described, the combination of a main-line speaking-tube, a valve in said main-line tube for closing the same, a branch speaking-tube, and a spring for automatically raising the branch tube out of position for use, said branch tube being connected with said main-line tube adjacent to said valve, substantially as described.

4. In a device of the character described, the combination of a main-line speaking-tube, a valve in said main-line tube for closing the same, a branch speaking-tube connected with said main-line tube adjacent to said valve, and means for connecting the valve and branch tube, whereby in raising the branch tube out of position for use the opening of said valve will be insured, substantially as described.

5. In a device of the character described, the combination of a main-line speaking-tube, two valves in said main-line tube for closing the same, and a branch speaking-tube, said branch tube being connected with said main-line tube between and adjacent to said valves, substantially as described.

6. In a device of the character described, the combination of a slotted box, a main-line speaking-tube, the adjacent sections of which enter said box, a pivoted T-shaped branch speaking-tube, the cross-tube of which is connected with said main-line tube, a valve hinged within said box between the main-line section and said branch tube, a spring for automatically opening said valve, and a spring for automatically raising said branch tube out of position for use, substantially as described.

7. The combination of a railway-car, a locomotive-engine, and a tender, a section or piece of speaking-tube attached to said car and adapted to form a part of a main line of speaking-tube extending from the engine to said car, said section being provided with a mouth-piece, a flexible pipe on the outer side of said car connected with said section of tube, a coupling attachment on the outer end of said flexible pipe for coupling it to another pipe, and a section or piece of speaking-tube supported or partially supported by the tender and extending to the engine, said section being in connection with the section attached to the car and provided with a mouth-piece for the engineer, substantially as described.

8. In a device of the character described, the combination of a railway-car, a section or piece of speaking-tube attached to said car and adapted to form a part of a main-line speaking-tube extending from the engine to one or more cars of the train, a flexible pipe connected with each end of said section of tube, a coupling attachment at the outer end of each of said flexible pipes for coupling it to the corresponding pipe of another car, two valves in said section of tube for closing the same, and a branch speaking-tube connected with said section of tube between and adjacent to said valves, substantially as described.

9. In a device of the character described, the combination of a railway-car, a section or piece of speaking-tube attached to said car and adapted to form a part of a main line of speaking-tube extending from the engine to one or more cars of the train, a flexible pipe connected with each end of said section of tube, a coupling attachment at the outer end of each of said flexible pipes for coupling it to a corresponding pipe of another car, two valves in said section of tube for closing the same, springs for automatically opening said valves, and a branch speaking-tube connected with said section of tube between and adjacent to said valves, substantially as described.

10. In a device of the character described, the combination of a railway-car, a section or piece of speaking-tube attached to said car and adapted to form a part of a main line of speaking-tube extending from the engine to one or more cars of the train, a flexible pipe connected with each end of said section of tube, a coupling attachment at the outer end of each of said flexible pipes for coupling it to the corresponding pipe of another car, two valves in said section of tube for closing the same, a branch speaking-tube connected with said section of tube between and adjacent to said valves, and a spring for automatically raising said branch tube out of position for use, substantially as described.

11. The combination of a railway-car, a locomotive-engine, and a tender, a section or piece of speaking-tube attached to said car and adapted to form a part of a main line of speaking-tube extending from the engine to one or more cars of the train, a flexible pipe connected with each end of said section of tube, a coupling attachment at the outer end of each of said flexible pipes for coupling it to a corresponding pipe of another car, two valves in said section of tube for closing the same, a branch speaking-tube provided with a mouth-piece, said branch tube being connected with said section of tube between and adjacent to said valves, and a section or piece of speaking-tube supported or partially supported by the tender and extending to the engine, said section being in connection with the section attached to the car and provided with a mouth-piece for the engineer, substantially as described.

JAMES C. FARMER.
CHARLES A. SHAW.

Witnesses:
O. M. SHAW,
E. L. SAWYER.